No. 686,229.  
Patented Nov. 5, 1901.  
A. L. KULL.  
LOCKING DEVICE FOR STEERING MECHANISM OF AUTOMOBILES.  
(Application filed Mar. 20, 1901.)  
(No Model.)
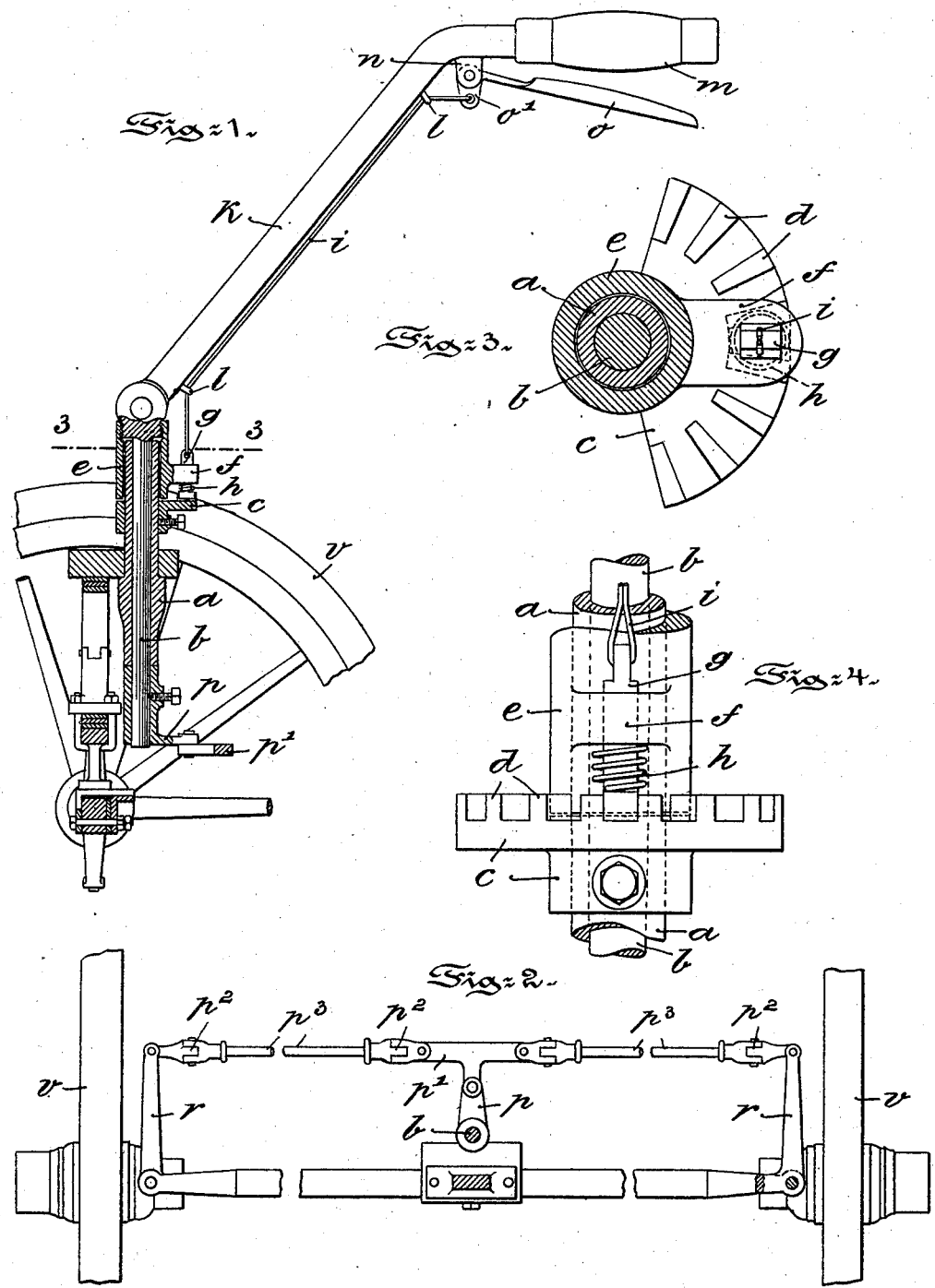
Witnesses  
Wilhelm Vogt  
Thomas M. Smith.
Inventor  
Albert L. Kull,  
By J. Walter Douglas  
Attorney.

UNITED STATES PATENT OFFICE.

ALBERT L. KULL, OF CAMDEN, NEW JERSEY.

LOCKING DEVICE FOR STEERING MECHANISM OF AUTOMOBILES.

SPECIFICATION forming part of Letters Patent No. 686,229, dated November 5, 1901.

Application filed March 20, 1901. Serial No. 51,981. (No model.)

*To all whom it may concern:*

Be it known that I, ALBERT L. KULL, a citizen of the United States, residing at Camden, in the county of Camden and State of New Jersey, have invented certain new and useful Improvements in Locking Devices for the Steering Mechanism of Automobiles and the Like, of which the following is a specification.

My invention has relation to a device for locking the steering mechanism of an automobile or similar vehicle in required position; and in such connection it relates more particularly to the construction and arrangement of such a device.

The principal object of my invention is to provide a simple and efficient device for locking or releasing the steering mechanism for an automobile or similar vehicle, said device being arranged so as to relieve the operator from continually holding the steering-rod and to lock the steering-rod in its required position and said device being connected with the steering-rod so as to be readily controlled by the operator when the rod is to be manipulated.

The nature and scope of my invention will be more fully understood from the following description, taken in connection with the accompanying drawings, forming part hereof, in which—

Figure 1 is a view, partly in side elevation and partly in vertical section, of the steering mechanism and auxiliary parts, the locking device embodying main features being shown in operative connection with said steering mechanism. Fig. 2 is a top or plan view of the steering mechanism, the steering-rod being shown in horizontal section. Fig. 3 is an enlarged horizontal sectional view taken on the line 3 3 of Fig. 1, and Fig. 4 is a rear elevational view of Fig. 3.

Referring to the drawings, $a$ represents a sleeve fixed to the framework of the vehicle, and $b$ represents the steering-shaft, adapted to turn in said sleeve. To the sleeve $a$ is secured a sector $c$, having at or near its periphery upwardly-projecting teeth $d$. Above the sector $c$ and surrounding the sleeve $a$ is a second sleeve $e$, secured to and traveling with the shaft $b$ of the steering mechanism. The movable sleeve $e$ is provided with an arm or projection $f$, having a vertical slot in which is arranged to slide a bolt $g$, the under face of which is adapted to engage the teeth $d$ on the sector $c$. A spring $h$, interposed between the arm $f$ and under face of the bolt $g$, serves normally to depress said bolt into operative engagement with the sector-teeth $d$. To the upper end of the bolt $g$ is secured one end of a chain, cord, or wire $i$, passing through the eyes $l$, projecting from the rod $k$, controlling the movement of the steering-shaft $b$. The cord or chain $i$ passes through the eyes $l$ parallel to the rod $k$ and is fastened at its other end to an arm $o'$ of a lever $o$, which is pivoted in a bracket $n$ of the rod $k$ at or near the handle end $m$ of said rod.

When the operator desires to turn the steering-shaft $b$, he grasps the handle $m$ and at the same time depresses the lever $o$ toward said handle $m$. The cord $i$ is thereby elevated and the bolt $g$ drawn upward in the arm $f$ of the sleeve $e$ against the tension of the spring $h$ to elevate the bolt $g$ from the teeth $d$ of the sector. When the steering-shaft $b$ has been turned sufficiently, the handle $m$ and lever $o$ are released, and the bolt $g$ is locked by its spring into the toothed face of the sector $c$. The movement of the shaft $b$ is transferred to an arm $p$ and thence by the link $p'$, toggles $p^2$, and arms $p^3$ is transmitted to the levers $r$, which cause the wheels $v$ to turn in the usual manner.

Having thus described the nature and object of my invention, what I claim as new, and desire to secure by Letters Patent, is—

1. In a device of the character described, a fixed sleeve, a steering-shaft adapted to turn in said sleeve, a sector provided with teeth at or near its periphery and fixed to said sleeve, a movable sleeve surrounding the fixed sleeve and secured to and traveling with said steering-shaft, a vertically-slotted arm or projection carried by the movable sleeve, a bolt adapted to traverse the slotted arm and to engage the teeth of the sector, a spring normally tending to lock the bolt in said teeth, and means for retracting said bolt, substantially as and for the purposes described.

2. In a device of the character described, a steering-shaft, a fixed sleeve wherein the shaft is adapted to turn, a sector provided with upwardly-projecting teeth and secured to said fixed sleeve, a movable sleeve surrounding the fixed sleeve and secured to the steering-shaft, a vertically-slotted arm projecting from the movable sleeve and arranged above the sector, a bolt adapted to traverse the arm, a spring adapted to lock the bolt in the teeth of the sector, a steering-rod controlling the movement of the steering-shaft, a lever located near the handle end of said steering-rod, and a chain or cord connecting said lever with the bolt and adapted when said lever is depressed toward the rod to elevate the bolt from the sector-teeth, substantially as and for the purposes described.

In testimony whereof I have hereunto set my signature in the presence of two subscribing witnesses.

ALBERT L. KULL.

Witnesses:
J. WALTER DOUGLASS,
THOMAS M. SMITH.